May 13, 1924.
F. S. DENISON
1,493,739
TIME CONTROLLED THERMOSTATIC SWITCH
Filed April 23, 1921   3 Sheets-Sheet 1
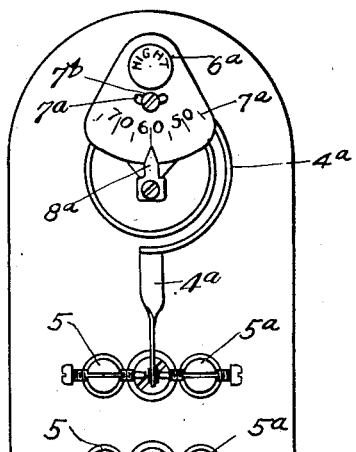
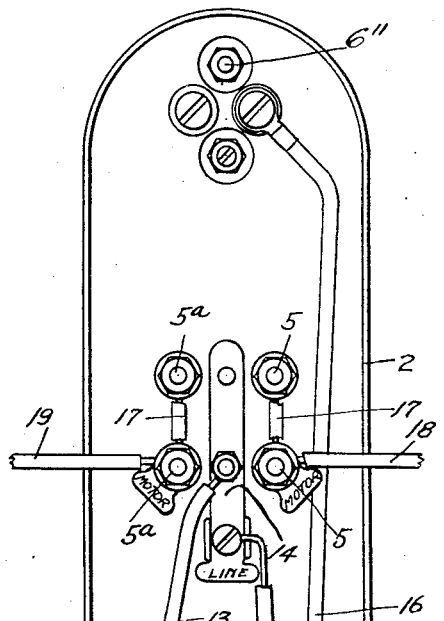
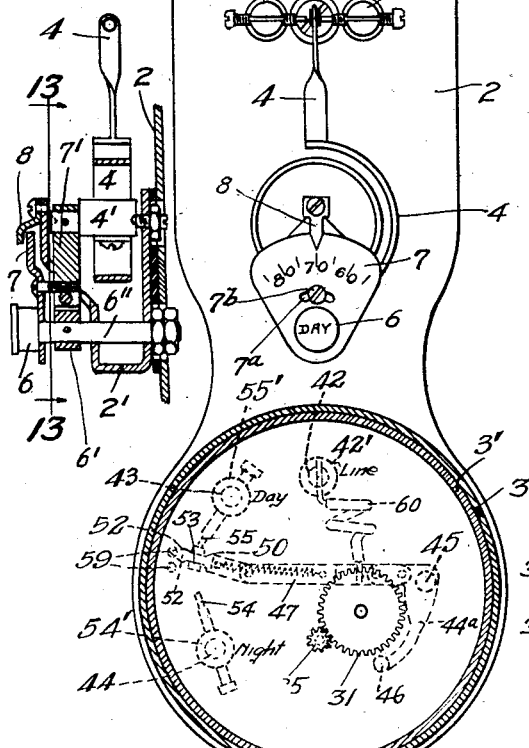
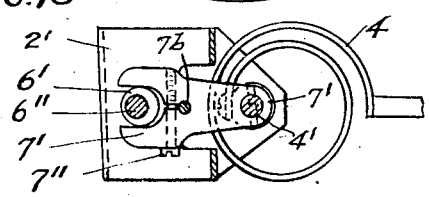
INVENTOR
FREDERICK S. DENISON.
BY *Pearl & Pearl*
HIS ATTORNEYS.

May 13, 1924.
F. S. DENISON
TIME CONTROLLED THERMOSTATIC SWITCH
Filed April 23, 1921
1,493,739
3 Sheets-Sheet 2
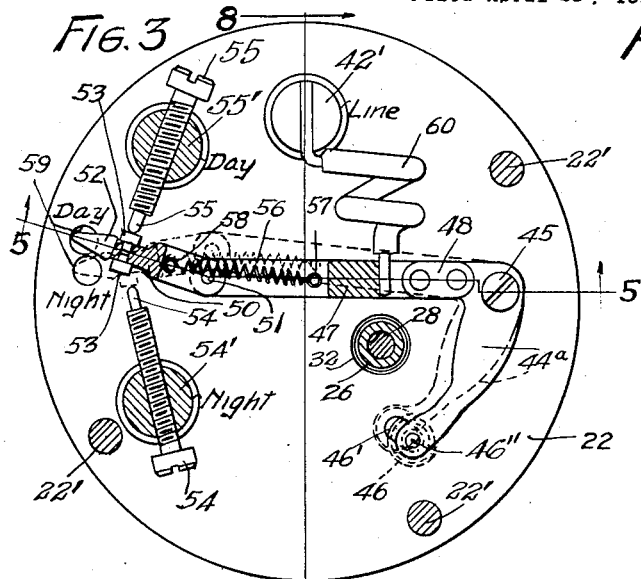
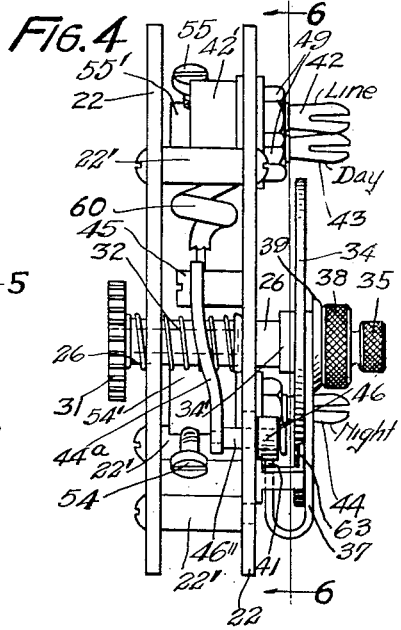
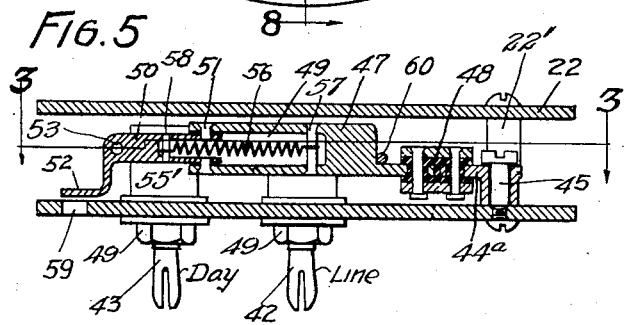
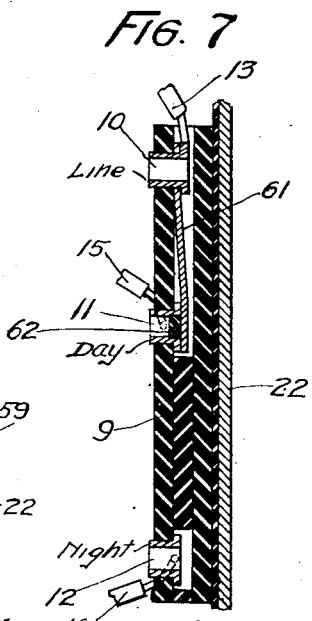
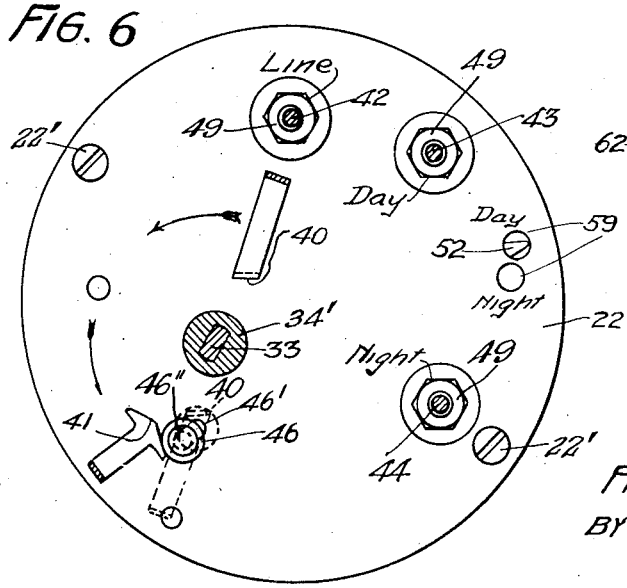
INVENTOR.
FREDERICK S. DENISON.
BY Paul Paul
HIS ATTORNEYS.

May 13, 1924.
F. S. DENISON
1,493,739
TIME CONTROLLED THERMOSTATIC SWITCH
Filed April 23, 1921    3 Sheets-Sheet 3
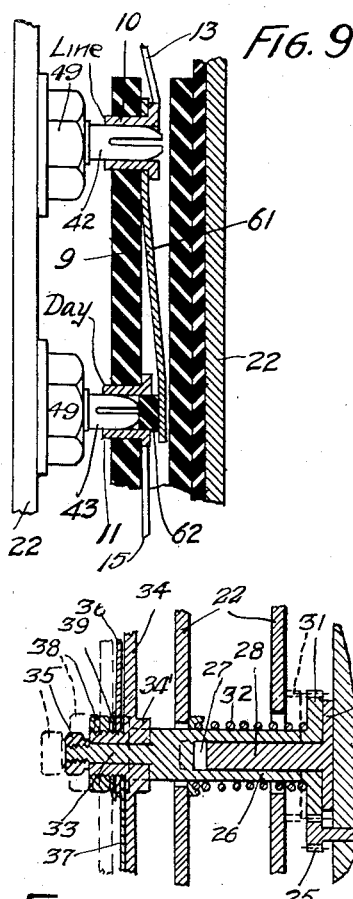
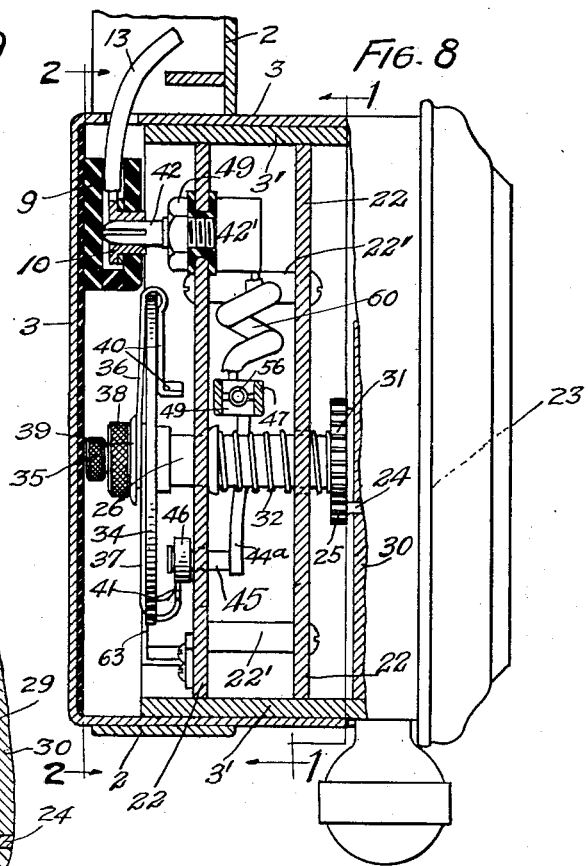
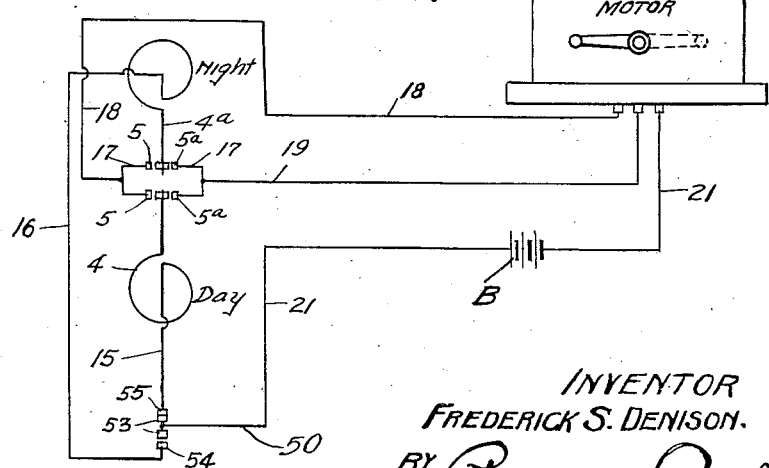
INVENTOR
FREDERICK S. DENISON.
BY
HIS ATTORNEYS Patented May 13, 1924.

1,493,739

UNITED STATES PATENT OFFICE.

FREDERICK S. DENISON, OF MINNEAPOLIS, MINNESOTA, ASSIGNOR TO MINNEAPOLIS HEAT REGULATOR COMPANY, OF MINNEAPOLIS, MINNESOTA, A CORPORATION OF MINNESOTA.

TIME-CONTROLLED THERMOSTATIC SWITCH.

Application filed April 23, 1921. Serial No. 464,017.

*To all whom it may concern:*

Be it known that I, FREDERICK S. DENISON, a citizen of the United States, resident of Minneapolis, county of Hennepin, State of Minnesota, have invented certain new and useful Improvements in Time-Controlled Thermostatic Switches, of which the following is a specification.

The object of my invention is to provide a temperature controlling device having day and night circuits with means for automatically shifting the control from one circuit to the other to the end that no manual adjustment will be required to set the instrument for day or night use. Usually in devices of this kind where a time mechanism is employed for shifting the contacts of the thermostat from a night to day temperature, manual adjustment is necessary at some time, either night or morning, to set the instrument for the temperature desired for the succeeding period, no attempt being made to automatically adapt the instrument for both night and day service.

My invention contemplates an apparatus of simple, inexpensive construction which, when once set for the desired periods of change, will operate from day to day automatically, changing the thermostat back and forth for day and night service without any attention on the part of the operator except to wind the timer at predetermined intervals.

My invention consists generally in various constructions and combinations, all as hereinafter described and particularly pointed out in the claims.

In the accompanying drawings forming part of this specification,

Figure 1 is a front view of a thermostat embodying my invention, the time apparatus being in section, Figure 2 is a rear view of the same;

Figure 3 is a sectional view on the line 3—3 of Figure 5;

Figure 4 is a side elevation of Figure 3, showing the timer mechanism;

Figure 5 is a sectional view on the line 5—5 of Figure 3;

Figure 6 is a sectional view on the line 6—6 of Figure 4;

Figure 7 is a sectional view on the line 7—7 of Figure 2;

Figure 8 is a side view of the timer mechanism with a portion of the wall of the timer broken away;

Figure 9 is a detail sectional view, showing the manner of mounting the timer on the casing of the thermostat;

Figure 10 is a detail sectional view illustrating the manner of disconnecting the thermostat controlled mechanism from the driving shaft of the timer;

Figure 11 is a diagrammatic view, showing the circuits between the timer and the thermostat;

Figure 12 is a detail sectional view of the day thermostat bar, showing the manner of mounting and adjusting it;

Figure 13 is a sectional view on the line 13—13 of Figure 12;

In the drawing, 2 represents the base of the thermostat, having a casing 3 at its lower end, circular substantially in form, forming a socket into which the timer mechanism is inserted, as will hereinafter appear. The thermostat is provided with thermostatic bars 4 and $4^a$, each bar having a pair of contact posts 5 and $5^a$ arranged preferably between the thermostatic bars near the middle portion of the base. Each bar is provided with finger grips 6 and $6^a$ and dials 7 and $7^a$ adapted for limited movement with respect to indicator hands 8 and $8^a$. When these finger grips are rotated, the thermostatic bars will be shifted to adjust them relatively to the graduations of the dials.

Referring to Figure 12, I prefer to mount the thermostatic bar 4 on an oscillating stud 4' that is supported between the arms of a bracket 2' secured to the base 2. A forked plate 7' is mounted at one end of the stud 4' and a cam 6' is fitted between the arms of the fork and is mounted on a stud 6" that is journaled in the arms of the bracket 2'. The finger grip 6 is mounted on the stud 6" and when this stud is rocked, the cam 6' will be oscillated to move the plate 7' horizontally on the stud 4' as a center. This movement will, of course, shift the bar 4 and change its position with respect to the contact posts. I prefer, however, to provide means of adjustment without shifting this thermostatic bar and I accomplish this by mounting the plate 7 on the stud 6'' and providing a slot 7ª in said plate through which is inserted a screw 7ᵇ. The tongue 8, mounted on one end of the bracket 2', overhangs the edge of the plate 7 opposite the graduations thereon. When, therefore, it is desired to set the instrument, assuming that it has gotten out of adjustment for some reason, the operator will allow the thermostatic bar to contact with one of the posts, assuming that the room is at the desired temperature. Then the operator, observing the degree of temperature in the room, will loosen the screw 7ᵇ and adjust the plate until the indicator 8 is opposite the figures on the plate corresponding to the degrees of temperature. The screw 7ᵇ is then tightened and the adjustment will be complete.

The arms of the plate 7' may be adjusted to compensate for wear by means of a screw 7''.

Within the casing 3 is an insulating block 9 having bushings 10, 11 and 12 mounted therein and normally insulated from the casing and from each other. A conductor 13 connects the bushing 10 with the line or battery circuit, preferably at the point indicated by 14. A conductor 15 connects the bushing 11 with the thermostatic bar 4 and a conductor 16 connects the bushing 12 with the thermostatic bar 4ª. Conductors 17 connect the opposite contact posts 5 and 5ª. Conductors 18 and 19 lead from the contacts 5 and 5ª to the motor 20 and a conductor 21 leads from the motor through a battery B to the conductor 13, thus making an effective circuit for each bar controlled by the operation of the timer.

The clock or timer comprises a frame 22 adapted to fit snugly within the casing 3. The forward portion of said timer has the usual dial 23 and clock hands, not shown, in the rear of which is the usual train of gears or clock mechanism terminating in a shaft 24 provided with a driving pinion 25. The shaft 24 is driven from the spring barrel and the pinion 25 has no direct connection with the hands of the time piece. The gear ratio is such that the pinion will travel in unison with the hands, but being driven from the spring barrel, does not impose a load or burden on the hands and the attendant gearing, which might interfere with the time-keeping qualities of the clock.

A post 26, having a socket 27, is mounted on a stud 28 fastened by a flange 29 to the clock casing 30. The post 26 supports a gear 31 which meshes with the pinion 25 and is driven thereby and is capable of both longitudinal and rotary movement on the stud 28, but is normally held in its working position, as indicated in Figures 8 and 10 by means of a compression spring 32. The outer end of the post has a stud 33 on which is mounted a dial 34, and a finger grip 35 is mounted on the outer end of the stud 33 to be grasped by the operator for the purpose of moving the post 26 lengthwise to disengage it from the pinion 25, as indicated by dotted lines in Figure 10. When the gear 31 has been disengaged from the pinion 25 by the outward movement of the post, the operator may turn or rotate the post and dial and set the dial so that the figures thereon will synchronize with those on the dial of the time piece. This dial has figures thereon corresponding to the figures of the clock dial, being divided into an A. M. and P. M. group, as indicated in Figure 2. Day and night indicator hands 36 and 37 are mounted on the hub of the dial 34 for rotary adjustment thereon over the figures of the dial and are clamped in any desired position by means of the threaded thumb nut 38 and spring washer 39. These indicator hands have cam extensions 40 and 41 which are bent around the peripheral edge of the dial and extend beneath it as indicated in Figure 8, and when the indicator hands are adjusted on the dial, the cam extensions or surfaces of the hands will be moved also and adjusted to the position of the dial where the operator desires the shifting movement to take place.

The frame of the timer has circuit closing plugs 42, 43 and 44, and these plugs are positioned to enter the sockets in the bushings 10, 11 and 12 when the timer frame is thrust into the casing on the base of the thermostat. A switch lever 44ª is pivoted at 45 on the thermostat frame and is provided at one end with an anti-friction roller 46. This roller has a stud which projects through a slot 46' in the frame 22 and is mounted in the end of the switch lever 44ª.

A block 47 is mounted on the lever 44ª adjacent to its pivot and insulated therefrom by a suitable non-conducting coupler 48. The block 47 has a recess 49 therein and an arm 50 is pivoted at 51 in said recess and is provided with a tongue 52 having contact surfaces 53 between contact screws 54 and 55. A tension spring 56 has one end connected at 57 to the block 47 and its other end attached at 58 within a recess in the arm 50, said spring bridging the pivotal connection 51 between the block and arm and forming therewith a switch device for alternately contacting the surfaces 53 with the screws 54 and 55, according to the direction of oscillation of the arm 47. When the switch lever is oscillated the spring 56 will be swung from one side to the other of the pivot 51, moving the contact surfaces 53 into engagement with the screws 54 and 55. The tension of the spring will effect a quick break of the circuit, allowing the contact to continue until the spring passes the center of the pivot, when it will instantly separate the surface from the contact screw, thereby preventing sparking and delay in the operation of the motor.

I prefer to provide the frame of the clock with peep-holes 59 through which the tongue 52 is visible, as indicated in Figure 6, so that the operator, when the clock is withdrawn from the thermostat can, at a glance, tell whether the switch is on the day or night contact. A conductor 60 connects the line with the arm 47 and is insulated by the coupling 48 from the frame, so that the circuit passes from the line through the conductor 60, the block 47 and the arm 50 to one or the other of the contact screws 54 and 55, depending on the position of the arm. This position of the arm will, of course, depend upon the movement of the switch lever 44$^a$, and roller 46 of which is positioned beneath the dial in the path of the cam arms 40 and 41 (see Figure 6). When, therefore, the dial in its rotation has brought the operating hands in position to actuate the lever 44$^a$, it will be oscillated on its pivot and the switch shifted from one contact to the other and thereby the thermostats will be automatically changed from night and day use or vice versa, without any attention or manual adjustment other than to see that the time piece is properly wound and adjusted for the hours when it is desired the changes to be made.

The position of the cam arms 40 and 41 is shown in Figure 6, the cam arm 41 having its surface in contact with the roller 46 to exert a pressure thereon and swing the switch lever 44$^a$, the roller stud sliding in the slot 46'. This movement pushes the stud to one end of the slot and the engagement of the other cam arm 40 at a later period pushes the stud and roller back to their original position in the path of the arm 41. This movement will be continued during the operation of the timer.

Referring to Figure 2, the dial is shown with the numeral 1 set opposite the roller of the switch lever and indicating that it is one o'clock A. M. by the time piece, the proper adjustment of the dial being effected by disengaging the post gear from its actuating pinion in the manner described and rotating the post and dial until the numeral on the dial opposite the end of the switch lever corresponds to the time as indicated by the dial of the clock. When this has been done, the clock hands and the dial 34 may be said to synchronize and will work in unison and cause the switch operating arms to engage the switch lever at the predetermined periods governed by the adjustment of the hands on the face of the dial.

In Figures 7 and 8 I have shown a circuit closing attachment comprising a spring arm 61 connected with the circuit closing bushing 10 and adapted to contact with the bushing 11 and provided with an insulating block 62 fitting within said bushing. This spring is designed to close the circuit between the line and the day contact, when the clock is removed from the thermostat, thus making the thermostatic control effective for day use and cutting out the night connections temporarily. As soon, however, as the clock is remounted on the thermostat, the day plug 43 will contact with the insulating block 62 and press it inwardly to the position shown in Figure 9, separating the spring 61 from the bushing 11 and breaking the circuit between the bushings 10 and 11. The night circuit will thereupon again be effective, ready for operation when the circuit closing hand of the time piece reaches the point or time when the operator desires the circuit to be closed.

In adjusting the device, referring to Figure 2, I prefer to mount an indicator 63 on the time piece frame opposite the end of the switch operating lever 44$^a$. Then when the dial is rotated with the numeral 1 set opposite this indicator, the person adjusting the instrument will know that the dial is set opposite or adjacent the end of the switch controlling lever 44$^a$.

As stated above, the dial in Figure 2 is set to correspond with the time of the clock, one o'clock A. M. Assuming now that the hand 36 is set on numeral 8, it will be eight hours before this hand contacts with the switch lever and changes the circuit. This will be at eight o'clock in the morning and the circuit will be changed from the night to the day thermostat. This day thermostat, will then control the circuits and the motor until eight P. M. or the time for which the indicator hand 37 is set on the dial. At that time by the clock the hand 37 will engage the switch lever and automatically shift the circuit from the day to the night thermostat and this night thermostat will be in control of the circuits during the night and until eight A. M. the next morning, when a shift to the day thermostat will take place. If for any reason the time piece stops or the hands become accidentally moved or need re-adjustment for the correct time, it is only necessary for the operator to disengage the post operating gear from its actuating pinion when the dial 34 may be adjusted until its figures synchronize with the clock hands and the operating gearing may be moved into re-engagement and the automatic control of the circuits and thermostats resumed. In this way I am able to regulate automatically the thermostatic circuits, shifting the control from one thermostatic bar to the other and adapting the instrument for day and night service.

From the foregoing description it will be understood that the break between the switch and contact points is instantaneous and there will be no appreciable period when the thermostats will be out of service. One or the other of them will be in the circuit substantially all the time. This will be found to be a decided advantage over slow moving cam mechanisms and the like, where one circuit is broken for a considerable period before the other is closed.

Throughout the specification I have referred to the day and night thermostats and day and night circuits. It will be understood that I do not confine the use of this device to such circuits, as the apparatus is applicable wherever it is desired to control a mechanism through one thermostat for a predetermined period and then automatically shift to another thermostat for another period of the same or different length than the first period, as circumstances may require or make desirable. For instance, one period may have a certain portion of the day and another period for the remainder of the day, or both periods may be during the night, or a period may be partly by day and partly by night, the day and night arrangement being merely a feature of the device when used for house temperature control. For factories, kilns, retorts, and the like the period of control may be of the same or different length and the changes take place at any desired time, regardless of whether it is day or night.

I claim as my invention:

1. A device of the class described comprising a base, a thermostat at one end of said base, a second thermostat at the other end of said base, a motor, and a switch in circuit with said thermostats and disposed to oscillate between oppositely disposed contacts to make circuit with one thermostat and break circuit with the other, and means for automatically operating said switch to shift the circuit from one thermostat to the other at predetermined times.

2. A device of the class described comprising a motor, a thermostat in circuit with said motor, a second thermostat also in circuit with said motor, a switch disposed to oscillate between oppositely disposed contacts for controlling the circuits through said motor and one or the other of the thermostats, and a time piece having means for operating said switch to close the circuits through said thermostats in alternation.

3. A device of the class described comprising a motor, a thermostat in circuit with said motor, a second thermostat also in circuit with said motor, a switch disposed to oscillate between oppositely disposed contacts for controlling the circuits through said motor and two thermostats, and a time piece having means for operating said switch to close the circuits through said two thermostats alternately, said switch operating means including a dial adapted for synchronous adjustment with the hands of the time piece, and means adjustable on said dial for engaging and operating said switch at predetermined intervals.

4. A device of the class described comprising a motor, a thermostat in circuit with said motor, a second thermostat also in circuit with said motor, a switch disposed to oscillate between oppositely disposed contacts for controlling the circuits through said motor and two thermostats and a time piece having means for operating said switch to close the circuits through said thermostats alternately, said switch operating means including a dial having figures thereon corresponding to the figures on the time piece dial and adapted for rotary adjustment to synchronize with the hands of the time piece, and means adjustable on said dial and extending around the periphery thereof and having cam surfaces for engaging and operating said switch at predetermined intervals.

5. A device of the class described comprising a motor, a thermostat in circuit with said motor, a second thermostat in circuit with said motor, a switch disposed to oscillate between oppositely disposed contacts for controlling the circuits through said motor and thermostats, a time piece and indicator hands mounted to move synchronously with the hands of the time piece and having means for operating said switch to close the circuit alternately through said thermostats at predetermined intervals.

6. A device of the class described comprising a motor, a thermostat in circuit with said motor, a second thermostat in circuit with said motor, a time piece, a switch with said motor and thermostats and having an operating lever, a switch dial having figures corresponding with the figures on the time piece dial mounted for adjustment over said switch lever, a stationary indicator for designating the proper adjustment of the switch dial with respect to the switch operating lever, and means mounted on said switch dial and adjustable thereover and having cam surfaces in position to contact with said switch lever and operate it at predetermined intervals to change the circuit through said thermostats.

7. A device of the class described comprising a motor, a thermostat in circuit with said motor, a second thermostat in circuit with said motor, a time piece and a switch controlled by the movement of said time piece for changing the circuit from one thermostat to the other, said time piece being removably mounted on its support and having means for automatically closing the circuit through one thermostat and cutting out said other thermostat when the time piece is removed.

8. A device of the class described comprising a base, two thermostats mounted thereon, a time piece having a socket in said base, a switch for said time piece having line and other separate circuits with said thermostats respectively, said time piece having studs thereon and said base having sockets for said studs connected respectively with said thermostats and the line, the socket for one thermostat having means for closing the circuit through said other thermostat and cutting out the companion thermostat when the time piece is removed, and said circuit closing means being actuated by the plug of one circuit when the time piece is mounted on said base for breaking the circuit with said other service plug and directing the circuit through one thermostat.

9. In a device of the class described, a thermostat, a second thermostat, a time piece, a switch for changing the circuit from one thermostat to the other, a switch dial operated from the time piece spring independently of the time piece hands and adapted to rotate in unison with said hands, means adjustable on said switch dial for automatically changing the switch from one thermostat to the other at predetermined periods, said switch dial being mounted for adjustment independently of the time piece hands to revolve synchronously therewith, and electric circuits for said switch and thermostats.

10. A device of the class described comprising a motor, a thermostat in circuit therewith, a time piece, a pinion driven therefrom, a post having a gear meshing with said pinion and mounted for longitudinal movement to disengage said gear from said pinion, a dial mounted to revolve with said post and having characters thereon corresponding to the characters of the time piece dial, said post and dial being normally revolved synchronously with the hands of the time piece, independent rotary adjustment of said post and dial being permitted when said gear is disengaged from said pinion, a switch in circuit with said thermostat and motor, and means adjustable on said post dial and revolving therewith to actuate said switch and change the circuit through said thermostat.

11. A device of the class described comprising a motor, a thermostat in circuit with said motor, a second thermostat in circuit with said motor, a time piece, a post geared to said time piece and mounted to be disengaged therefrom for independent rotary adjustment, a dial mounted on said post having characters corresponding to the time piece dial and mounted to revolve with said post synchronously with the hands of the time piece, a switch for shifting the circuit from one thermostat to the other, and means mounted on said post dial and adjustable over the characters thereon and having means for operating said switch at predetermined intervals for changing the circuit from one thermostat to the other thermostat.

12. A device of the class described comprising a base, a thermostatic bar thereon, and contact posts on opposite sides of said bar, a cam actuated device for shifting the position of said bar, a dial plate having graduations thereon normally oscillated by the movement of said cam device, and a normally stationary indicator, said dial plate being mounted for adjustment with respect to said indicator to permit adjustment of the thermostat without changing the position of said bar.

13. In a device of the class described, a thermostatic bar and contact post therefor, a dial having graduations, means for oscillating said bar and dial and means for moving said dial independently of said bar to adjust the thermostat without changing the position of said bar.

14. A device of the class described comprising a motor, a thermostat in circuit with said motor, a second thermostat in circuit with said motor and means for automatically shifting the electric current from one circuit to the other, said means including a switch mounted for instantaneous breaking of one circuit and closing of the other circuit, whereby one or the other of said thermostats will be in service substantially without interruption.

15. A device of the class described comprising a motor, a thermostat in circuit therewith, a second thermostat also in circuit with said motor, a switch controlling the circuits through said motor and thermostats, and a time piece having means for operating said switch to close the circuits through said thermostats alternately, said switch operating means including a dial adapted for synchronous adjustment with the hands of the time piece, and means adjustable on said dial for engaging and operating said switch at predetermined intervals.

16. A device of the class described comprising a motor, a thermostat in circuit therewith, a second thermostat in circuit with said motor, a switch for controlling the circuits through said motor and thermostats, and a time piece and indicator hands mounted to move synchronously with the hands of the time piece and having means for operating said switch to close the circuits alternately through said thermostats.

In witness whereof, I have hereunto set my hand this 20" day of April, 1921.

FREDERICK S. DENISON.